(12) United States Patent
Hjerde

(10) Patent No.: US 12,464,614 B2
(45) Date of Patent: Nov. 4, 2025

(54) SYSTEM AND METHOD FOR PRODUCING HIGH QUALITY TEMPERATURE ADJUSTABLE WHITE LIGHT

(71) Applicant: Morten Hjerde, Vinterbro (NO)

(72) Inventor: Morten Hjerde, Vinterbro (NO)

(*) Notice: Subject to any disclaimer, the term of this patent is extended or adjusted under 35 U.S.C. 154(b) by 83 days.

(21) Appl. No.: 18/632,285

(22) Filed: Apr. 11, 2024

(65) Prior Publication Data

US 2024/0349406 A1   Oct. 17, 2024

Related U.S. Application Data

(60) Provisional application No. 63/458,529, filed on Apr. 11, 2023.

(51) Int. Cl.
| | | |
|---|---|---|
| *H05B 45/10* | (2020.01) | |
| *H05B 45/20* | (2020.01) | |
| *H05B 47/165* | (2020.01) | |
| *F21S 10/02* | (2006.01) | |
| *F21Y 105/18* | (2016.01) | |
| *F21Y 113/13* | (2016.01) | |
| *F21Y 115/10* | (2016.01) | |

(52) U.S. Cl.
CPC ............ *H05B 45/20* (2020.01); *H05B 45/10* (2020.01); *H05B 47/165* (2020.01); *F21S 10/023* (2013.01); *F21Y 2105/18* (2016.08); *F21Y 2113/13* (2016.08); *F21Y 2115/10* (2016.08)

(58) Field of Classification Search
CPC ...... H05B 45/20; H05B 45/10; H05B 47/165; F21S 10/023; F21Y 2105/18; F21Y 2113/13; F21Y 2115/10; F21V 23/04
See application file for complete search history.

(56) References Cited

U.S. PATENT DOCUMENTS

| | | | |
|---|---|---|---|
| 6,523,976 B1 * | 2/2003 | Turnbull | ............... F21S 41/285 362/800 |
| 9,560,714 B1 | 1/2017 | Hjerde | |
| 2011/0062873 A1 * | 3/2011 | Gall | ........................ F21S 8/006 315/153 |

\* cited by examiner

*Primary Examiner* — Minh Tran
(74) *Attorney, Agent, or Firm* — RosserIP, LLC; Roy Rosser

(57) ABSTRACT

Systems and methods of producing high quality temperature adjustable white light using six different colored LEDs is disclosed. In one embodiment the six LEDs are a Red (630 nm), an Amber (589 nm), a lime LED (568 nm), a green LED (540 nm) a cyan LED (505 nm) and a blue (430 nm). Optimal relative intensities of the RGBACL LED are calculated by solving a matrix relating the CIE tristimulus values Alternatively, optimum relative intensities may be calculated for two light sources lying on a line of constant CCT value, but on opposite sides of the Planckian locus. These relative intensities for each of the light sources are then retained and adjusted as a group to obtain a single white light source of the requested CCT value lying on the Planckian locus.

18 Claims, 5 Drawing Sheets

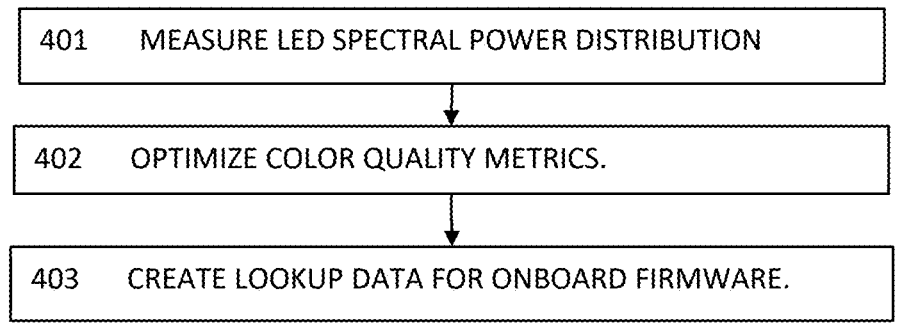
FIG. 4
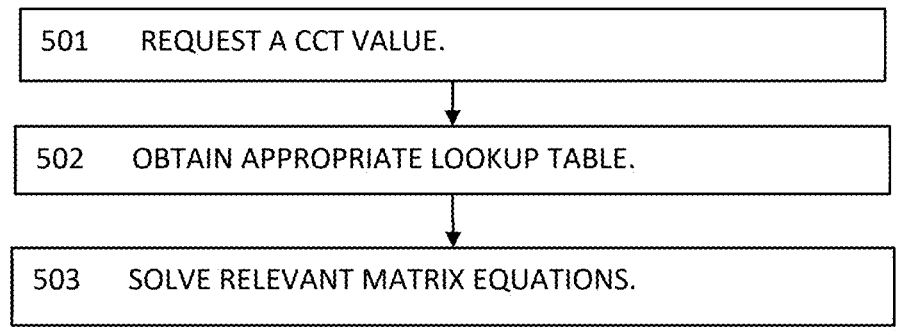
FIG. 5
$$\begin{bmatrix} X \\ Y \\ Z \\ 0 \\ 0 \\ 0 \end{bmatrix} - \begin{bmatrix} X_l & X_b & X_r & X_g & X_c & X_a \\ Y_l & Y_b & Y_r & Y_g & Y_c & Y_a \\ Z_l & Z_b & Z_r & Z_g & Z_c & Z_a \\ f_1 & f_1 & f_1 & -1 & 0 & 0 \\ f_2 & f_2 & f_2 & 0 & -1 & 0 \\ f_3 & f_3 & f_3 & 0 & 0 & -1 \end{bmatrix} \begin{bmatrix} L \\ B \\ R \\ G \\ C \\ A \end{bmatrix} = 0$$
600
FIG. 6

SYSTEM AND METHOD FOR PRODUCING HIGH QUALITY TEMPERATURE ADJUSTABLE WHITE LIGHT

CROSS-REFERENCE TO RELATED APPLICATIONS

This is a U.S. non-provisional patent application that claims priority to U.S. provisional patent application U.S. 63/458,529 entitled "LED Light Engine", that was filed on Apr. 11, 2023, the contents of which are hereby fully incorporated by reference.

BACKGROUND OF THE INVENTION

The invention relates to systems and methods for producing high quality, temperature adjustable white light, and more particularly to using assemblies of semiconductor light emitting diodes (LEDs) to produce that white light, and most particularly to using combinations of six different colors of LED to efficiently produce the high quality, temperature adjustable white light.

LED lighting has the advantages of being long lasting, energy efficient and producing less heat. LEDs are easily controlled, versatile and produce directed light which makes them particularly useful for spotlighting and accent lighting. However, because of the narrow spectral range of the individual LEDs, unless carefully selected and combined, they may produce less accurate color rendering than traditional incandescent and fluorescent lighting. Recent advances in LED technology have resulted in phosphor-converted devices that are both more efficient and produce a wider range of colors than conventional direct drive LEDs.

However, whereas, the relative intensities needed for producing a specific temperature white light from three different color LEDs, such as, for instance, a red, a green and a blue LED can be calculated relatively easily, the problem becomes significantly more difficult when using four or more different colored LEDs.

What is desired are systems and methods for quickly and efficiently calculating the current distribution required by up to six different color LEDs that may be optimal for producing a given chromaticity having a specified luminance and possessing satisfactory color quality metrics for a particular application.

Relevant prior art includes:
  U.S. Pat. No. 9,560,714 issued to M. Hjerde on Jan. 31, 2017 entitled "Color Temperature Adjustable, LED Based, White Light Source", the contents of which are hereby incorporated by reference in their entirety.

That patent describes assemblies of temperature monitored, semiconductor light emitting diodes (LEDs) that produce color temperature adjustable white light sources. Warm-white LEDs are combined with green and blue LEDs to produce light have continuous spectrum spanning the wavelength range of 400 to 700 nm with a white light point located at a selectable Planckian locus location and a color rendering index greater than 80. The circuitry includes LED temperature monitoring used to adjust LEDs spectral and luminosity output.

Various implementations are known in the art, but fail to address all of the problems solved by the invention described herein. Various embodiments of this invention are illustrated in the accompanying drawings and will be described in more detail below.

SUMMARY OF THE INVENTION

Inventive systems and methods of producing high quality temperature adjustable white light using six different colored LEDs are disclosed.

In a preferred embodiment, a combination of three conventional LEDs and three phosphor converted color LEDs (PC-LEDs) may be used to produce an energy efficient white light that may be adjustable in a range of correlated color temperatures (CCTs) from 1700 K to 20,000 K CCT and may have a color rendering index (CRI) greater than 95.

The six-color LED light engine of the present invention may include a digital processor, a power source, and groups of six LED's, with each LED having a different peak color. The digital processor may, for instance, be programmed to receive a request for a Correlated Color Temperature (CCT) value and to then automatically calculate optimal relative intensities for each of the six LEDs to produce a white light lying on the Planckian locus and having the required CCT with a satisfactory color quality metric. The digital processor may also automatically calculate an amount of power to be supplied to each of said six LEDs to obtain optimal relative intensities, and cause that power to be provided to produce that white light.

In a preferred embodiment, the six LEDs may be a red LED, an amber LED, a lime LED, a green LED, a cyan LED, and a blue LED.

In a more preferred embodiment, the red LED may have a peak emission at, or in a vicinity of, 630 nm, the amber LED may have a peak emission at, or in a vicinity of, 589 nm, the lime LED may have a peak emission at, or in a vicinity of, 568 nm, the green LED may have a peak emission at, or in a vicinity of, 540 nm, the cyan LED may have a peak emission at, or in a vicinity of 505 nm and the blue LED may have a peak emission at, or in a vicinity of, 430 nm.

In one embodiment of the invention, the digital processor may use a subset of lookup factors supplied from a more comprehensive table of optimized color quality metrics that may have been produced offline. The subset may, for instance, include values related to the six LEDs and to the requested CCT value. The digital processor may also obtain International Commission on Illumination (CIE) tristimulus values for the LEDs and the requested CCT value. A matrix equation relating the CIE tristimulus values may then be set up and solved to obtain the optimal relative intensities of the LEDs. These relative intensities may then be produced by supplying the necessary electrical power to the LEDs based on their individual specifications. The absolute intensities may then be set to provide the required luminance.

In another embodiment of the invention, the problem of may be solved by first creating two light sources, lying on a line of constant CCT but on the opposite side of a Planckian locus. The two light sources may then be combined to obtain a white light source of the requested CCT value on the Planckian locus by keeping the relative values of each of the two light sources fixed and adjusting them as groups. The resultant white light source may have very good color rendering index (CIE), typically greater than 95 CIE, even if it may not be the absolutely optimal possible.

Therefore, the present invention succeeds in conferring the following, and others not mentioned, desirable and useful benefits and objectives.

It is an object of the present invention to provide a compact, energy efficient white light source having selectable temperature and luminance and possessing satisfactory color quality metrics for high end applications in the cinema industry.

It is another object of the present invention to provide a portable, flexible, cost-effective, green lighting source for cinematographers, lighting technicians, filmmakers, and videographers.

BRIEF DESCRIPTION OF DRAWINGS

FIG. 4 is a flow diagram showing representative steps in calibrating an RGBACL LED Light Engine.

FIG. 5 is a flow diagram showing representative step 500 in calculating RGBACL LED power requirements.

FIG. 6 is a matrix equation for calculating power requirements of an RGBACL LED light source.

DETAILED DESCRIPTION OF THE INVENTION

Figure 1A:
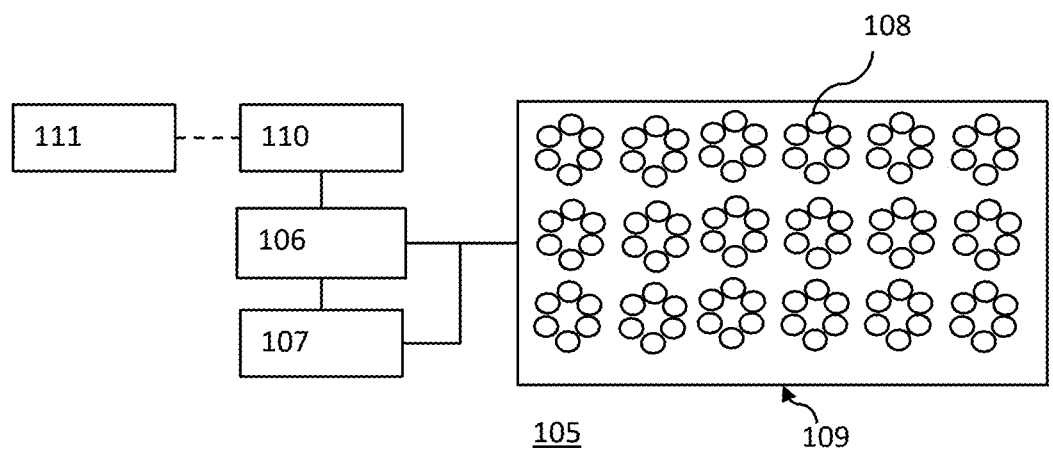
FIG. 1A shows a schematic representation of a six-color LED light engine of the present invention.

The preferred embodiments of the present invention will now be described with reference to the drawings. Identical elements in the various figures are identified, in so far as possible, with the same reference numerals. The embodiments that are described in detail are provided by way of explanation of the present invention, which is not intended to be limited thereto. In fact, those of ordinary skill in the art may appreciate upon reading the present specification and viewing the present drawings that various modifications and variations can be made thereto.

FIG. 1A shows a schematic representation of a six-color light emitting diode (LED) light engine of the present invention.

The six-color LED light engine 105 may, for instance, have a digital processor 106, a power source 107, and one or more groups of six LEDs 108, with with each LED having a different peak color.

Figure 1B:
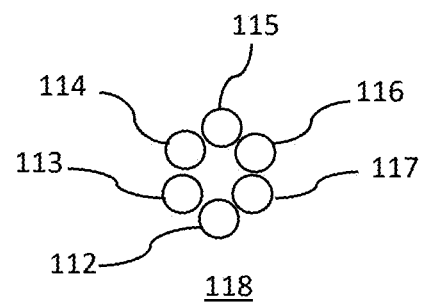
FIG. 1B shows a schematic representation of a RGBACL LED group of the present invention.

The six LEDs may be any suitable mixture of LEDs and PC-LED (phosphor converted light emitting diode). However, as shown in FIG. 1B, which is a schematic representation of a LED group of the present invention, in a preferred embodiment the LEDs may be a red, a green, a blue, an amber, a cyan and a lime LED, or a RGBACL LED group.

In a more preferred embodiment, the RGCACL group may consist of LEDs selected such that red LED may have a peak emission at, or in a vicinity of, 630 nm, the amber LED may have a peak emission at, or in a vicinity of, 589 nm, the lime LED may have a peak emission at, or in a vicinity of, 568 nm the green LED may have a peak emission at, or in a vicinity of, 540 nm, the cyan LED may have a peak emission at, or in a vicinity of, 505 nm and the blue LED may have a peak emission at, or in a vicinity of, 430 nm.

As shown in FIG. 1A, the six-color LED light engine 105 may include an RGBACL panel 109 having one or more groups of six LED's 108. The RGBACL panel 109 may be functionally connected to a digital processor 106, which may in turn be functionally connected to a power source 107, a communications and a control module 110. There may also be a communications and control module 110 that may communicate with the communications and control module 110 either directly or wirelessly by a means such as, but not limited to, BlueTooth™ or WiFi.

The digital processor 106 may include firmware and/or software and may be programmed to perform a variety of functions. These functions may include the ability to receive a request for a Correlated Color Temperature (CCT) value that may be relayed from the remote control 111 via the communications and control module 110. The request may, for instance, be the result of a user interacting with the remote control 111.

Having received a request for white light at a given intensity and having a particular CCT value, the digital processor may be programmed to automatically calculate optimal relative intensities of each of the six LEDs so as to produce the requested CCT value white light at the given intensity and with a satisfactory color quality metric.

The digital processor may also be programmed to then automatically calculate an amount of power to supply to each of the six LEDs to obtain the calculated optimal relative intensities. This power may then be provided to the groups of six LED's on the RGBACL panel from the power source, which may, for instance, be a battery such as, but not limited to, a rechargeable lithium/ion battery.

The white light provided by the six-color LED light engine may have the requested CCT value, lie on the Planckian locus and have satisfactory color quality metrics. The color quality metrics may, for instance, be measured by one or more or the Color Rendering Index (CRI), the Television Lighting Consistency Index (TLCI), the Color Quality Scale (CQS), and the Spectral Similarity Index (SSI). Each of these well-known indexes may have a value from 0 to 100, with 100 representing perfect. In a preferred embodiment of the present invention the white light typically has CRI and TLCI values greater than 95, and in a most preferred embodiment, a CRI 98 and a TLCI 99.

Figure 2A:
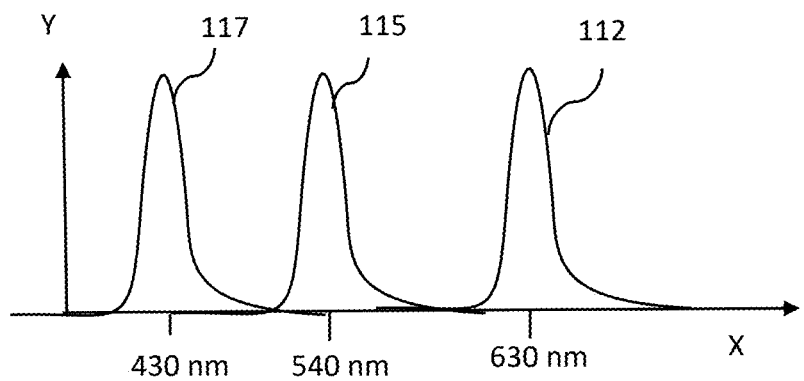
FIG. 2A shows a schematic representation of a spectral output of a group of three direct drive light emitting diodes (DD-LEDs).

FIG. 2A shows a schematic representation of a spectral output of a group of three exemplary direct drive light emitting diodes (DD-LEDs).

Direct drive light emitting diodes (DD-LEDs) are the more traditional LEDs in which a combination of semiconductor materials may be used to emit light of specific color with a narrow-band spectral output. DD-LEDs produce highly saturated colors but in a limited range of colors. For example, the three DD-LEDs shown in FIG. 2A may be a red LED 112 that may have a peak emission in a vicinity of 630 nm, a green LED 115 that may have a peak emission in a vicinity of 540 nm and a blue LED 117 that may have a peak emission in a vicinity of 430 nm. Although these three DD-LEDs may be combined to produce a white light, because of the gaps in the overall spectrum, many colors when illuminated with that white light would not appear as they would under more natural white light such as, but not limited to, sunlight, i.e., the color rendering index (CRI) would be low.

Recent technological advances have resulted in phosphor-converted color LEDs (PC-LEDs). These typically use a blue or ultraviolet LED chip as the driving light source, which excites a phosphor coating on the surface of the chip to emit light of a specific color. The phosphor coating converts the blue or ultraviolet light to a broader spectrum of colors, allowing for a wider range of color options.

Figure 2B:
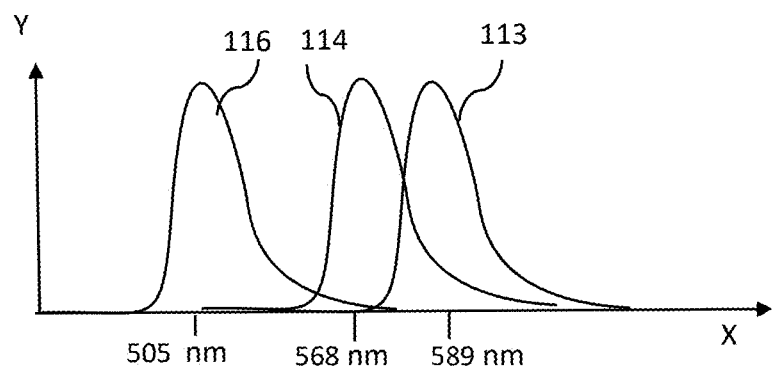
FIG. 2B shows a schematic representation of a spectral output of a group of three phosphor-converted light emitting diodes (PC-LEDs).

FIG. 2B shows a schematic representation 201 of the spectral outputs of a group of three phosphor-converted light emitting diodes (PC-LEDs). As illustrated, PC-LEDs typically have a slightly broader band spectral output. They are also typically more energy efficient than DD-LEDs, requiring less power to produce the same amount of light. For instance, a phosphor-converted lime colored LED may produce 125 lumens with a drive current of 350 mA compared to a direct drive green LED (530 nm) that may only produce 90 lumens with the same drive current. Other phosphor-converted LEDs that are now available include, but are not limited to, amber and cyan. Phosphor converted LEDs may be obtained from manufacturers such as, but not limited to, the Nichia Corporation headquartered in Anan, Tokushima 774-8601, Japan.

The PC-LEDs shown in FIG. 2B are an amber LED 113 that may have a peak emission at or in a vicinity of 589 nm, a lime LED 114 that may have a peak emission at or in a vicinity of 568 nm, and a cyan LED 116 that may have an peak emission at or in a vicinity of 505 nm.

The precise peak of emission of the LEDs may be found from the manufacturer's specifications but are typically within +/− nm of those detailed above.

Figure 2C:
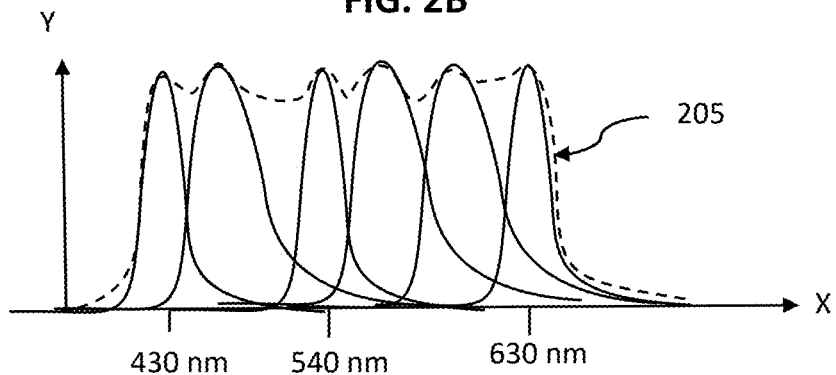
FIG. 2C shows a schematic representation of a spectral output of a combined group of DD-LEDs and PC-LEDs forming an RGBACL LED group.

These three colors of PC-LEDs may be selected to complement the traditional red, green and blue DD-LEDs. This complementarity may be seen in FIG. 2C which shows a schematic representation 201 of a spectral output of a combined group of DD-LEDs and PC-LEDs forming an RGBACL LED group. In particular, the combined spectral output 205 of the RGBACL LED group may provide a smoother overall spectral output so that most colors illuminated by a white light formed from a combination of them would appear nearly the same as they would under natural sunlight, i.e., they would have a high color rendering index (CRI).

Figure 3:
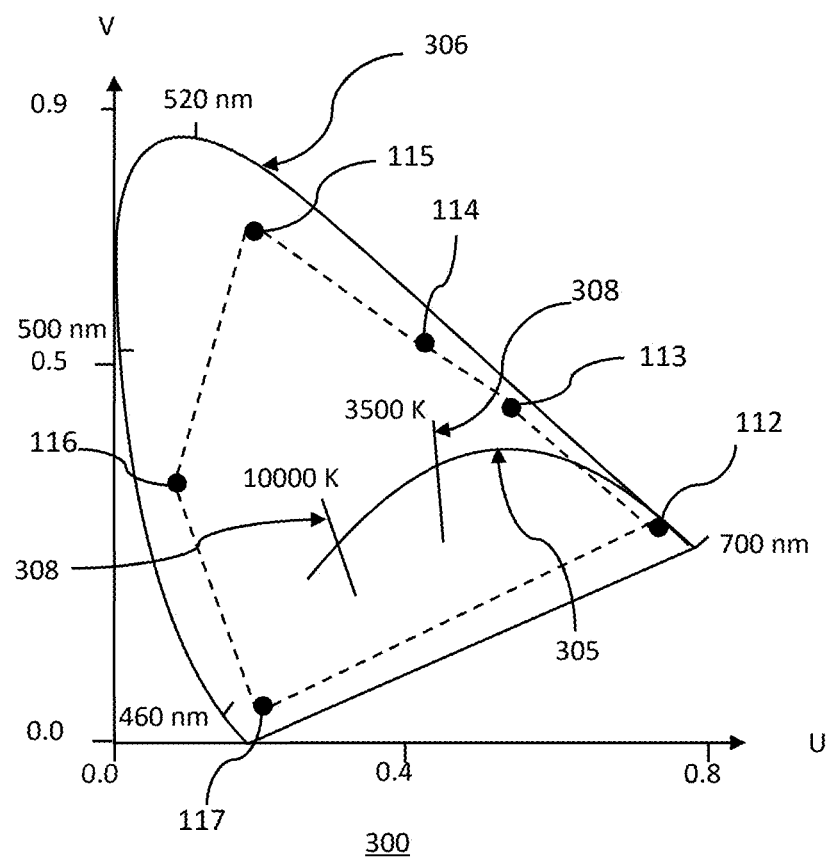
FIG. 3 shows a schematic representation of a CIE 1931 color space chromaticity diagram.

FIG. 3 shows a schematic representation 300 of a CIE 1931 color space chromaticity diagram.

In the CIE 1931 UV color space chromaticity diagram, the outer curved boundary is the spectral (or monochromatic) locus 306, with wavelengths shown in nanometers. The UV positions of the six RGBACL LED spectral peaks are plotted on the diagram. A suitable combination of the six LEDs may produce light of any hue contained within the polygon formed by joining the UV positions of the six LEDs. Of particular interest to cinematographers, the theatrical community and the photographic community may be white lights that lie on the Planckian curve or locus 305.

The Planckian curve 305, also known as the blackbody radiation curve, describes the spectrum of radiation emitted by a perfect blackbody at a particular temperature. In film or TV production, the Planckian curve is used to determine the color temperature of light sources, which is a measure of the warmth or coolness of the light. The color temperature is defined as the temperature of a blackbody radiator whose emitted light has the same color appearance as the light source being measured. Warm colors with a lower color temperature, around 2700K-3200K, may be used to create a cozy, intimate setting, while cool colors with a higher color temperature, around 5600K-6500K, may be used to create a brighter, more energetic atmosphere, or to simulate daylight.

The correlated color temperature (CCT) of a specific, or test, light source may be described as the temperature of the Planckian radiator under which a color sample may be perceived as most closely resembling that same color sample seen under the test light source. These may, for instance, be represented by lines of constant correlated color 308 that may be drawn perpendicular to the Planckian locus 305, passing through it at the appropriate Planckian color/temperature location.

FIG. 4 is a flow diagram 400 showing representative steps in calibrating an RGBACL LED Light Engine.

In Step 401 "MEASURE LED SPECTRAL POWER DISTRIBUTION", the power spectrum of each of the six LEDs to be used in the light engine may be measured. The spectrum may, for instance, be measured using a spectrometer such as, but not limited to, a USB spectrometer made by Ocean Optics of Largo, FL. The power spectrum may, for instance, be measured over a range of drive currents.

In Step 402 "OPTIMIZE COLOR QUALITY METRICS", the data gathered in Step 401 may be used to obtain values that optimize scores on one or more or the well-known color quality measurement metrics such as, but not limited to, the color rendering index (CRI), the Television Lighting Consistency Index (TLCI), the Spectral Similarity Index (SSI), or the Color quality scale (CQS). Each of these quality indices may be represented as a score between 1 and 100, with a score of 100 indicating that the light source produces color matching identical to that which would be achieved under sunlight of the same color temperature.

This optimization may, for instance, be performed using a numerical optimization algorithm such as, but not limited to, a Sequential Least Squares Programming (SLSQP) algorithm. The optimal performance may be obtained for a range of Planck white lights ranging from, for instance, 2000 K to 20,000 K. This optimization may require extensive computing resources and may be beyond the capabilities of chips available for handheld or small devices.

In Step 403 "CREATE LOOKUP DATA FOR ONBOARD FIRMWARE", the output from Step 402 may be used to create one or more look up tables that may be used by the firmware or software associated with the light engine. The lookup data may, for instance, be used to calculate the current to supply to each LED relative to each other to generate light having a requested CCT value and with adequate light quality characteristics for a particular application of the light engine. The lookup data may be a subset of the comprehensive data obtained in the previous step.

FIG. 5 is a flow diagram showing representative steps 500 in calculating RGBACL LED power requirements.

In Step 501 "REQUEST A CCT VALUE" a user may request a CCT value. This may be done on an interface directly associated with the light engine, or it may be performed on a mobile device such as, but not limited to, a smartphone or tablet that may be connected to the light source via a communications protocol such as, but not limited to, WiFi or the BlueTooth™ protocol.

In Step 502 "OBTAIN APPROPRIATE LOOKUP TABLE", an appropriate lookup table relevant to the requested CCT value may be obtained. This table may, for instance, have been generated by the method of FIG. 4 and may be stored on firmware or memory that may be directly associated with the light engine, or it may be stored on a device such as, but not limited to, a smartphone or tablet that may be in communication with the light engine.

In Step 503, "SOLVE RELEVANT MATRIX EQUATIONS", the values from the lookup table may be used to calculate the relevant power, or current, to be supplied to each of the LEDs in the RGBACL LED light engine. This may, for instance, be done using a set of matrix equations such as, but not limited to, those shown in FIG. 6. These equations may, for instance, be solved using an algorithm such as, but not limited to, a lower-upper (LU) decomposition algorithm. Such an algorithm may be viewed as a matrix form of Gaussian elimination.

In numerical analysis and linear algebra, a lower-upper (LU) decomposition or factorization factors a matrix as the product of a lower triangular matrix and an upper triangular matrix.

FIG. 6 is a matrix equation suitable for calculating power requirements of an RGBACL LED light source.

X,Y,Z represent the CIE tristimulus values for the requested CCT white light source. The CIE tristimulus values are a set of three numbers that represent the amounts of three hypothetical primary colors required to match a given color stimulus under a standardized set of viewing conditions developed by the Commission Internationale de l'Eclairage (CIE).

$X_l$ $Y_l$ $Z_l$ ... represent the CIE tristimulus values for each of the LEDs.

L, B, R, G, C, A represent the output of the LEDs.

f1 represents the lookup factor for how much G should be used at requested CCT.

f2 represents the lookup factor for how much C should be used at requested CCT.

f3 represents the lookup factor for how much A should be used at requested CCT.

This matrix equation may be solved by standard matrix methods such as, but not limited to, LU decomposition, to obtain the required relative output intensities for each LED channel.

As outlined above, automatically calculating optimal relative intensities of each of the six LEDs to produce a white light having the requested CCT value with satisfactory color quality metrics further may be accomplished in the following steps:

A lookup table of optimized color quality metrics for the six selected color LEDs may be calculated and provided or made available in whole or in part to the light engine;

Software or firmware associated with the light engine may then automatically obtaining a set of lookup factors from the lookup table that may correspond to the requested CCT value;

The CIE tristimulus values for each of the six color LEDS may be provided to or automatically obtained by the light engine;

CIE tristimulus values for the requested CCT value may be provided to or automatically obtained by the light engine;

A matrix equation linking the CIE XYZ tristimulus values of the required CCT to the CIE tristimulus values of each of said six LEDs using a set or subset of the lookup factors may be provided to or automatically created by the light engine; and, Software or firmware associated with the light engine may be programmed such that the matrix equation may be automatically solved, thereby obtaining the optimal relative intensities of each of the six LEDs.

Figure 7:
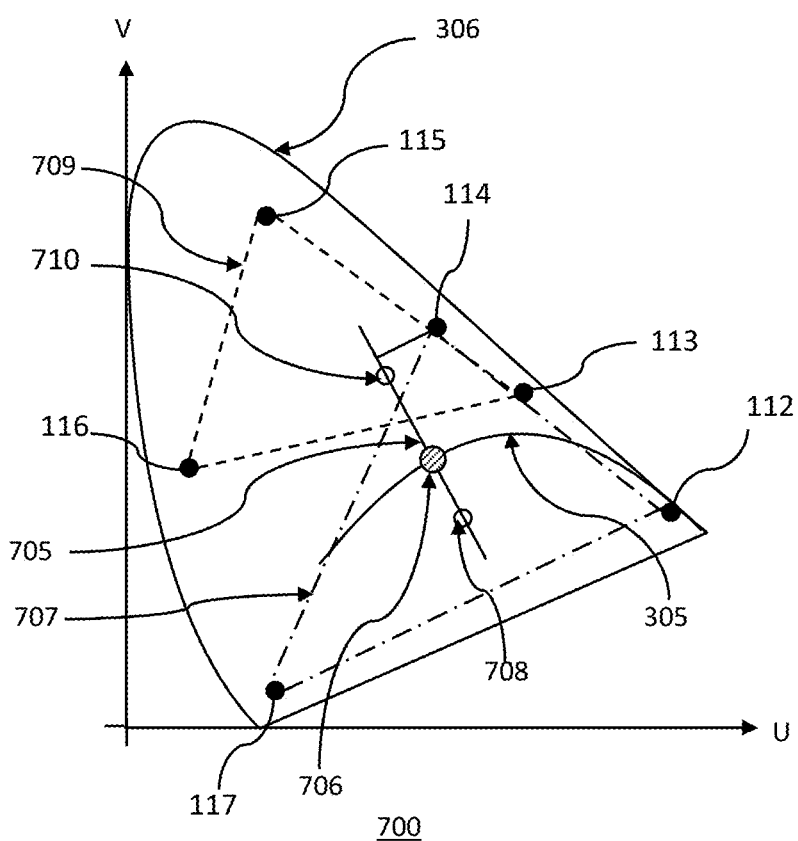
FIG. 7 shows a schematic representation of a further method of obtaining the relative power requirements of a group of RGBACL LEDs in a light engine.

FIG. 7 shows a schematic representation 700 of a further method of obtaining the relative power requirements of a group of RGBACL LEDs in a light engine.

A user may select a white light 708 having particular or desired UV coordinates within the spectral locus 306 of the color space chromaticity diagram and lying on the Planckian locus 305.

A line of constant CCT 705 may be drawn as line normal to the Planckian locus passing through the desired UV position on the Planckian locus. The LED that is closest to this line may then be selected. In this instance, the lime LED 114 that may have a peak emission at or in a vicinity of 568 nm. A first triangle 707 of LEDs that encloses the desired UV location may be formed using the Lime LED and two other LEDs, in this instance the red LED 112 that may have a peak emission at or in a vicinity of 630 nm and the blue LED 117 that may have a peak emission at or in a vicinity of 430 nm. Relative intensities of these three LEDs may then be calculated to form a first light 708 that may lie on the line of constant CCT 705 drawn normal to the Planckian locus and passing through the desired UV position on the Planckian locus. This calculation may be accomplished by, for instance, arbitrarily assigning one of the LEDs to have unit intensity, thereby reducing the problem to two equations having two unknowns.

A second triangle 709 of LEDs may then be formed by the remaining three LEDs, in this instance, the amber LED 113 that may have a peak emission at or in a vicinity of 589 nm, the green LED 115 that may have a peak emission at or in a vicinity of 540 nm, and the cyan LED 116 that may have a peak emission at or in a vicinity of 505 nm. Relative intensities of these three LEDs may then be calculated to form a second light 710 that may lie on the line of constant CCT 705 but on the opposite side of the Planckian locus of the first light.

These two white lights, i.e., first light 708 and the second light 710, may then each be treated as a single unit, i.e., their relative current ratios maintained, and the two mixed together to obtain the desired light. i.e., the white light 706 of the required CCT value lying on the Planckian locus.

Although this invention has been described with a certain degree of particularity, it is to be understood that the present disclosure has been made only by way of illustration and that numerous changes in the details of construction and arrangement of parts may be resorted to without departing from the spirit and the scope of the invention.

The invention claimed is:

1. A method of producing temperature adjustable white light, comprising:
providing a six-color LED light engine having a digital processor, a power source, and one or more groups of six LED's each LED having a different peak color and, wherein, said digital processor is programmed to perform the functions of:
receiving a request for a Correlated Color Temperature (CCT) value;
automatically calculating optimal relative intensities of each of said six LEDs to produce said CCT and provide a satisfactory color quality metric;
automatically calculating an amount of power to supply to each of said six LEDs to obtain said optimal relative intensities; and
providing said amount of power from said power source to said groups of six LEDs, thereby obtaining a white light having said CCT value with satisfactory color quality metrics.

2. The method of claim 1, wherein, automatically calculating optimal relative intensities of each of said six LEDs to produce said CCT and provide satisfactory color quality metrics further comprises:
providing a lookup table of optimized color quality metrics for said six color LEDs;
automatically obtaining a set of lookup factors from said lookup table corresponding to said CCT value;

providing CIE tristimulus values for each of said six color LEDS;

automatically obtaining CIE tristimulus values for the requested CCT value;

automatically creating a matrix equation linking said CIE XYZ tristimulus values of the required CCT to said CIE tristimulus values of each of said six LEDs using said set of lookup factors; and, automatically solving said matrix equation, thereby obtaining said optimal relative intensities of each of said six LEDs.

3. The method of claim 2, wherein, said six LEDs are a red LED, an amber LED, a lime LED, a green LED, a cyan LED, and a blue LED.

4. The method of claim 3, wherein, said red LED 112 has a peak emission in a vicinity of 630 nm, said amber LED 113 has a peak emission in a vicinity of 589 nm, said lime LED 114 has a peak emission in a vicinity of 568 nm said green LED 115 has a peak emission in a vicinity of 540 nm, said cyan LED 116 has a peak emission in a vicinity of 505 nm and said blue LED 117 has a peak emission in a vicinity of 430 nm.

5. The method of claim 1, wherein, automatically calculating optimal relative intensities of each of said six LEDs to produce said CCT further comprises:

automatically obtaining CIE xy coordinates for said CCT value;

automatically obtaining CIE xy coordinates for each of said six LEDs;

in CIE space:

automatically obtaining a line of constant CCT value normal to a Planckian locus passing through said CCT CIE xy coordinate;

automatically selecting a first LED having a CIE xy coordinate closest to said line of constant CCT value;

automatically forming a first triangle linking said first LED's xy coordinate to xy coordinates of a second LED and a third LED such that said first triangle encloses said CCT xy value; automatically calculating relative intensities for said first, second and third LEDs to create a first light lying on said line of constant CCT value;

automatically forming a second triangle linking a fourth, a fifth and a sixth LEDs; automatically calculating relative intensities for said fourth, fifth and sixth LEDs to create a second light lying on said line of constant CCT value on an opposite side of said Planckian locus from said first light; and, automatically adjusting the overall intensities of said first and said second lights to produce a white light located at said requested CCT CIE xy coordinate on said Planckian locus.

6. The method of claim 5, wherein, in said steps of calculating relative intensities one of said intensities is arbitrarily set to unity, thereby reducing the problem to solving two equations with two unknowns.

7. The method of claim 6, wherein, said six LEDs are a red LED, an amber LED, a lime LED, a green LED, a cyan LED, and a blue LED.

8. The method of claim 7, wherein, said red LED has a peak emission in a vicinity of 630 nm, said amber LED has a peak emission in a vicinity of 589 nm, said lime LED has a peak emission in a vicinity of 568 nm said green LED has a peak emission in a vicinity of 540 nm, said cyan LED has a peak emission in a vicinity of 505 nm and said blue LED has a peak emission in a vicinity of 430 nm.

9. The method of claim 1, wherein, said satisfactory color quality metric comprise a color rendering index (CRI) score greater than 95.

10. A temperature adjustable white light, comprising:

a six-color LED light engine having a digital processor, a power source, and one or more groups of six LED's each LED having a different peak color and, wherein, said digital processor is programmed to perform the functions of:

receiving a request for a Correlated Color Temperature (CCT) value;

automatically calculating optimal relative intensities of each of said six LEDs to produce said CCT and provide satisfactory color quality metrics;

automatically calculating an amount of power to supply to each of said six LEDs to obtain said optimal relative intensities; and providing said amount of power from said power source to said groups of six LEDs, thereby obtaining a white light having said CCT value with satisfactory color quality metrics.

11. The system of claim 10, wherein, automatically calculating optimal relative intensities of each of said six LEDs to produce said CCT and provide satisfactory color quality metrics further comprises:

providing a lookup table of optimized color quality metrics for said six color LEDs;

automatically obtaining a set of lookup factors from said lookup table corresponding to said CCT value;

providing CIE tristimulus values for each of said six color LEDS;

automatically obtaining CIE tristimulus values for the requested CCT value;

automatically creating a matrix equation linking said CIE XYZ tristimulus values of the required CCT to said CIE tristimulus values of each of said six LEDs using said set of lookup factors; and, automatically solving said matrix equation, thereby obtaining said optimal relative intensities of each of said six LEDs.

12. The system of claim 11, wherein, said six LEDs are a red LED, an amber LED, a lime LED, a green LED, a cyan LED, and a blue LED.

13. The system of claim 12, wherein, said red LED has a peak emission in a vicinity of 630 nm, said amber LED has a peak emission in a vicinity of 589 nm, said lime LED has a peak emission in a vicinity of 568 nm said green LED has a peak emission in a vicinity of 540 nm, said cyan LED has a peak emission in a vicinity of 505 nm and said blue LED has a peak emission in a vicinity of 430 nm.

14. The system of claim 10, wherein, automatically calculating optimal relative intensities of each of said six LEDs to produce said CCT further comprises:

automatically obtaining CIE xy coordinates for said CCT value;

automatically obtaining CIE xy coordinates for each of said six LEDs;

n CIE space:

automatically obtaining a line of constant CCT value normal to a Planckian locus passing through said CCT CIE xy coordinate;

automatically selecting a first LED having a CIE xy coordinate closest to said line of constant CCT value;

automatically forming a first triangle linking said first LED's xy coordinate to xy coordinates of a second LED and a third LED such that said first triangle encloses said CCT xy value;

automatically calculating relative intensities for said first, second and third LEDs to create a first light lying on said line of constant CCT value;

automatically forming a second triangle linking a fourth, a fifth and a sixth LEDs;

automatically calculating relative intensities for said fourth, fifth and sixth LEDs to create a second light lying on said line of constant CCT value on an opposite side of said Planckian locus from said first white light; and, automatically adjusting the overall intensities of said first and said second lights to produce a white light located at said requested CCT CIE xy coordinate on said Planckian locus.

15. The system of claim 14, wherein, in said steps of calculating relative intensities one of said intensities is arbitrarily set to unity, thereby reducing the problem to solving two equations with two unknowns.

16. The system of claim 15, wherein, said six LEDs are a red LED, an amber LED, a lime LED, a green LED, a cyan LED, and a blue LED.

17. The system of claim 16, wherein, said red LED has a peak emission in a vicinity of 630 nm, said amber LED has a peak emission in a vicinity of 589 nm, said lime LED has a peak emission in a vicinity of 568 nm said green LED has a peak emission in a vicinity of 540 nm, said cyan LED has a peak emission in a vicinity of 505 nm and said blue LED has a peak emission in a vicinity of 430 nm.

18. The system of claim 10, wherein, said satisfactory color quality metric comprise a color rendering index (CRI) score greater than 95.

\* \* \* \* \*